(12) United States Patent
Yellai et al.

(10) Patent No.: US 7,725,721 B2
(45) Date of Patent: May 25, 2010

(54) METHOD AND SYSTEM FOR TRANSFERRING SOFTWARE AND HARDWARE FEATURE LICENSES BETWEEN DEVICES

(75) Inventors: Prabhakara Rao Yellai, San Jose, CA (US); Phong Ky Vo, San Jose, CA (US); Mihir Maniar, Sunnyvale, CA (US); Eric B. Eggel, San Jose, CA (US); Alex Van Truong, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1558 days.

(21) Appl. No.: 10/993,634

(22) Filed: Nov. 18, 2004

(65) Prior Publication Data

US 2006/0106727 A1    May 18, 2006

(51) Int. Cl.
*H04L 9/08* (2006.01)
*H04L 9/14* (2006.01)
*G06F 21/32* (2006.01)

(52) U.S. Cl. ................. 713/171; 713/156; 713/175; 705/59; 380/279

(58) Field of Classification Search .............. None
See application file for complete search history.

(56) References Cited

U.S. PATENT DOCUMENTS

| | | | | |
|---|---|---|---|---|
| 5,138,712 A | 8/1992 | Corbin | ............ | 726/30 |
| 5,287,408 A | 2/1994 | Samson | | |
| 5,553,139 A | 9/1996 | Ross et al. | ............ | 705/59 |
| 5,758,069 A | 5/1998 | Olsen | | |
| 5,940,504 A | 8/1999 | Griswold | | |
| 6,557,105 B1 | 4/2003 | Tardo et al. | | |
| 6,961,858 B2 * | 11/2005 | Fransdonk | ............ | 726/29 |
| 7,067,567 B2 | 6/2006 | Benitez et al. | | |
| 7,073,063 B2 * | 7/2006 | Peinado | ............ | 713/171 |
| 2002/0010863 A1 * | 1/2002 | Mankefors | ............ | 713/189 |
| 2003/0041243 A1 * | 2/2003 | Olguin et al. | ............ | 713/172 |
| 2003/0097655 A1 | 5/2003 | Novak | | |
| 2003/0181242 A1 * | 9/2003 | Lee et al. | ............ | 463/42 |

OTHER PUBLICATIONS

Stolowitz Ford Cowger LLP, Listing of Related Cases, Nov. 10, 2009.

* cited by examiner

*Primary Examiner*—Nasser Moazzami
*Assistant Examiner*—Fatoumata Traore
(74) *Attorney, Agent, or Firm*—Stolowitz Ford Cowger LLP

(57) ABSTRACT

A method and system for transferring licenses between electronic devices supporting licensable features. Specifically, in a method a request is generated for transferring a license between first and second electronic devices. The request includes first information unique to the first electronic device, second information unique to the second electronic device. The request is sent to a license distributor to generate a master key. The master key includes a removal key including the first information and an add key including the second information. The removal key is used to remove the license from the first electronic device when the first information matches official versions of the first information. The add key is revealed from the master key when the license is successfully removed. The add key is used to add the license to the second electronic device when the second information matches official versions of the second information.

43 Claims, 7 Drawing Sheets

METHOD AND SYSTEM FOR TRANSFERRING SOFTWARE AND HARDWARE FEATURE LICENSES BETWEEN DEVICES

RELATED UNITED STATES PATENT APPLICATION

This Application is related to U.S. patent application Ser. No. 10/994,701, concurrently filed with the present Application on Nov. 18, 2004 entitled "Method and System for Installing Software and Hardware Feature Licenses on Devices". To the extent not repeated herein, the contents of this related patent application are hereby incorporated herein by reference.

TECHNICAL FIELD

Embodiments of the present invention relate to the field of network connection management. More particularly, embodiments of the present invention relate generally to the transfer of software and hardware feature licenses between networking devices.

RELATED ART

Asynchronous Transfer Mode (ATM) technology is used as a backbone technology for some modern carrier networks. ATM supports network transmission of information including data as well as real-time voice and video. In an ATM network multiple virtual channels are used to carry multiple data streams. As a result, multiple discrete paths are dynamically created on demand through network devices (e.g., switches, routers, etc.) in an ATM switched network to carry information traffic without relying on expensive and dedicated individual physical circuits. As such, traffic is relayed across an ATM network consisting of the network devices.

Software and hardware license management for the network devices is important in maintaining good customer relations. A good licensing management scheme can help manage a growing number of licenses required for a customer that is expanding services of network devices in an ATM network. Managing the licensing of common software and hardware service features available to all the network devices allows customers to implement features based on what the customer requires both at the time of original installation and in the future.

However, one of the problems in managing licensing for network devices is that enforcement of the licenses should be as transparent to the customer as possible. This problem is more challenging in the domain of carrier class networking products (e.g., ATM switches and routers) where connectivity to the ATM network may not be available for licensing management.

One conventional license management scheme discloses a centralized license manager that communicates with each of the network devices through the communication network. However, this management scheme is inadequate in ATM networks. That is, management of the network devices does not necessarily occur over the network in an ATM network. This is especially true when the network device fails.

Another conventional license management scheme includes a card based model. Licenses are packaged onto memory on a particular card (e.g., service module). In this case, the license is dedicated to the service module and enables the associated service feature on the service module when incorporated into a network device. As such, use of the service feature is allowed only on the service module if a license is included on the service module. However, several problems exist with this card based model. In one case, when the service module fails, the replacement service model would have to have its memory programmed with the same or better licenses as originally found on the failed service module. This is unsatisfactory as suitable spares outfitted with the same licenses are cost prohibitive since duplicate licenses go unused. As such, suitable spares with the correct format of licenses are usually unavailable.

In addition, when a new licensable feature is purchased to be implemented on a network device, the new license must be programmed into the memory of the corresponding service module that is implementing the licensable feature. This usually involves the help of a technical representative to program the service module. The use of technical representatives can be time consuming for a customer who is interested in bringing the new features on-line as soon as possible. In addition, on the customer service side, this programming of licenses is an inefficient use of human resources.

BRIEF DESCRIPTION OF THE DRAWINGS

The above and other objects and advantages of the present invention will be more readily appreciated from the following detailed description when read in conjunction with the accompanying drawings, wherein.

DETAILED DESCRIPTION OF THE INVENTION

Figure 1:
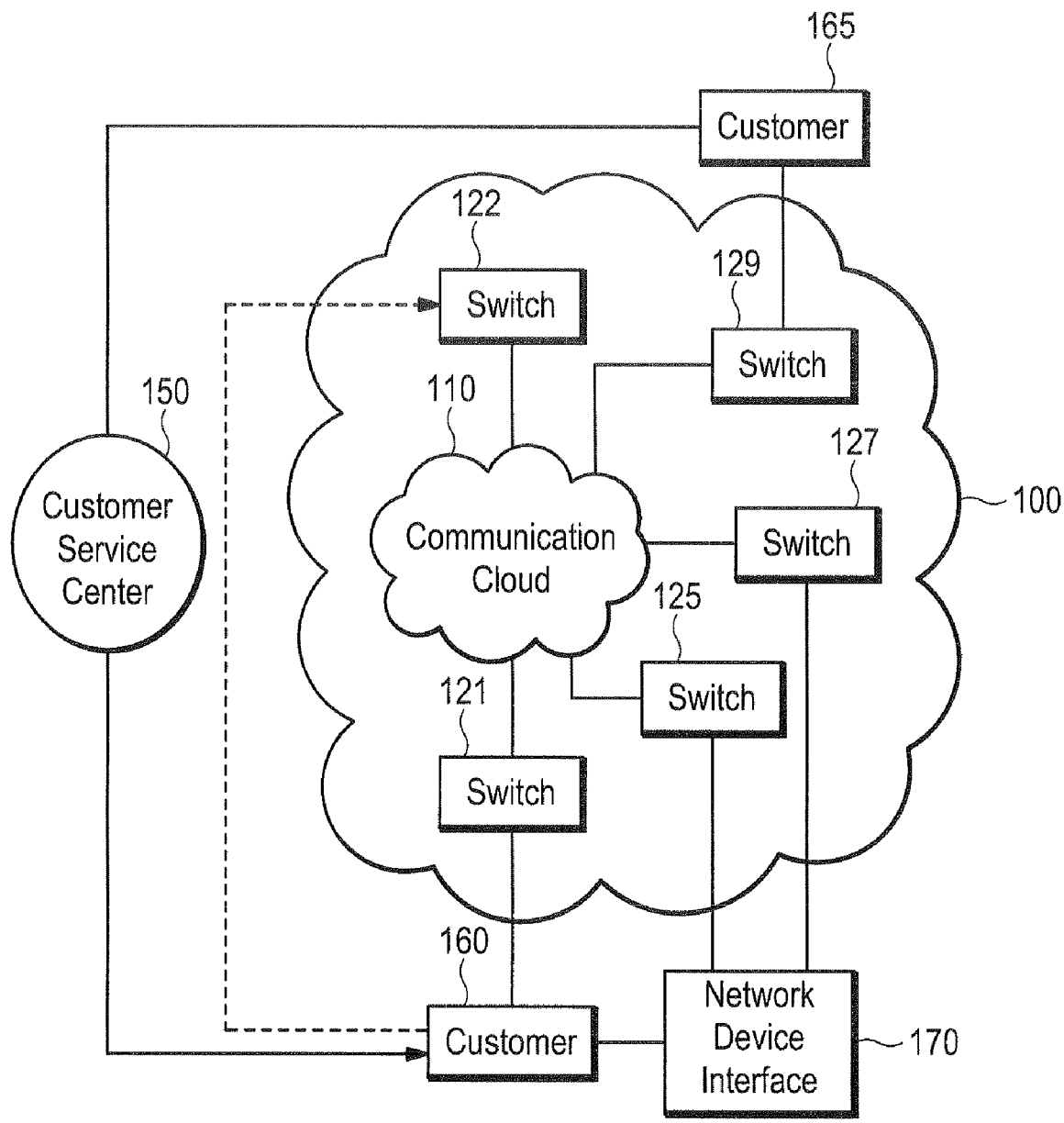
FIG. 1 is an exemplary ATM network illustrating the relationship between the customer and the customer service center when managing licenses at an electronic device supporting licensable features, upon which an embodiment of the present invention can be deployed, in accordance with one embodiment of the present invention.

Reference will now be made in detail to the preferred embodiments of the present invention, a method and system of transferring licenses in a node based licensing scheme between electronic devices that are capable of supporting licensable features, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims.

Embodiments of the present invention can be implemented on software running on a computer system, for example in software contained on a computer readable medium. For instance, the computer system may be a personal computer, notebook computer, server computer, mainframe, a network device such as a switch, router, network control computer, networked computer, and the like. This software program is operable for transferring licenses between electronic devices that are capable of supporting licensable features. In one embodiment, the computer system includes a processor coupled to a bus and memory storage coupled to the bus. The memory storage can be volatile or non-volatile and can include removable storage media. The computer can also include a monitor, provision for data input and output, etc.

Some portions of the detailed description which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "receiving," "comparing," "transferring," "generating," and "removing," "installing," or the like, refer to the actions and processes of a computer system, or similar electronic computing device, including an embedded system, that manipulates and transforms data represented as physical (electronic) quantities within the computer system's registers and memories into other data similarly represented as physical quantities within the computer system memories or registers or other such information storage, transmission or display devices.

Accordingly, various embodiments of the present invention disclose a method and system for transferring hardware and software licenses between electronic devices capable of supporting licensable features. Embodiments of the present invention provide for the management of licenses that is completely transparent to the operations of the electronic devices, since management of licenses occurs locally at the electronic device. In addition, the licensing management scheme of the present invention reduces service outages as licenses are maintained for a period of time before, during, and after device failure, so that replacement devices are enabled with the licenses of the failed device. Also, the license management scheme is scalable to large numbers of electronic devices since the management of license is decentralized. Further, the license management scheme can flexibly be used to enforce varying types of software and hardware implementations, such as software features, hardware entities like ports, bandwidth, connection capacity, etc.

Embodiments of the present invention are described in terms of transferring licenses between electronic devices supporting licensable features. More specifically, in some embodiments each of the electronic devices can be any device that is capable of supporting licensable services. For example, the electronic device can be a personal computer that requires a license to enable the use of software features, hardware features that are located on the personal computer, or to enable certain capacity or performance parameters available on the personal computer. Other embodiments are well suited to transferring licenses between electronic devices (e.g., a network device such as a network switch) that each includes a chassis with multiple service modules that are plugged into slots associated with the chassis. These service modules support various licensable features that are activated with a license. These licensable features can include the forwarding of internet protocol packets, providing voice/video services, providing Asynchronous Transfer Mode/Frame Relay (ATM/FR) services, etc.

FIG. 1 is a block diagram depicting an exemplary Asynchronous Transfer Mode (ATM) network 100, in accordance with one embodiment of the present invention. ATM is a high performance, cell oriented switching and multiplexing technology that utilizes fixed-sized cells to carry different types of traffic, such as voice, video, data, etc. ATM is a connection oriented packet switching technique in which all packets are of fixed length (e.g., 53 bytes). While the present embodiment is described within the context of network devices for illustration purposes only, these network devices are illustrative of electronic devices in general that are capable of supporting licensable services, as described previously.

The ATM network 100 includes a set of ATM switches interconnected by point-to-point ATM links or interfaces. For instance, switches 121, 122, 125, 127, and 129 are switches and can respectively represent the start, connecting, and end point of communications through the ATM network 100, and are coupled together by the communication cloud 110. Other switches or network devices may be contained within the communication cloud 110 in the ATM network 100. For example, the switches 121, 122, 125, 127, and 129 can be directly connected or further connected through other switches in the network 100 that facilitates ATM communication between the nodes.

A link from a switch can contain thousands of connections. In an ATM network, the connections are of varying bandwidth. Over these connections, information is transferred using ATM in an integrated manner. Switches are responsible for cell transmission and switching through the ATM network 100. For instance, switch 121 can receive an incoming connection and switches the incoming connection through switches in the ATM network 100 until reaching its destination, e.g., switch 122. Some of the services provided by the switches and network devices in the ATM network 100 are enabled through licenses.

Also included within FIG. 1 is customer 160. Customer 160 manages a set of network devices within the ATM network 100. For instance, customer 160 may manage the switches 121, 122, 125, 127, and other switches within the communication cloud 110. In addition, FIG. 1 includes customer 165. For instance, customer 165 may manage another set of switches, including switch 129. Management of the switches for each of the customers is through a direct link with each of the switches that is separate from the ATM network 100. For example, the customer may enter commands or instruction sequences (e.g., through a command line interface) directly at the switch, as indicated by dotted line connection between the customer 160 and switch 122. Also, the customer may interface with the switch through a direct communication link, as indicated by the solid line connection between the customer 160 and switch 121, as well as customer 165 and switch 129. In addition, the customer may enter commands and instruction sequences to various switches through network device interface 170 that are directly linked to switches 127 and 125.

In embodiments of the present invention, the customer enters commands (e.g., command line interface [CLI] commands) or instruction sequences for the transferring of licenses between electronic devices. That is, one or more customers may transfer licenses between devices. For instance, in one case, customer 160 may transfer licenses between switch 121 and 127. For example, a license may be removed from switch 121 and added to switch 127. In another case, licenses may be transferred between switches 121 and 129 through the cooperation of customer 160 and customer 165. For example, a license may be removed from switch 121 and added to switch 129.

In addition, FIG. 1 includes a customer service center 150 that provides technical assistance and services for the network devices in the ATM network 100. In one embodiment, the customer service center 150 is the originator of licenses that can be installed on the network devices (e.g., switches) managed by the customer 160 and 165. In addition, the customer service center 150 provides the necessary information for controlling the transfer of licenses between network devices. For purposes of the present invention, licenses can be transferred automatically between devices in the ATM network 100 in a manner that minimizes human intervention in the process, as will be fully described below.

Embodiments of the present invention are capable of managing and transferring licenses between electronic devices that are capable of supporting licensable features (e.g., an ATM network device, such as a switch in FIG. 1). In one embodiment, licenses are transferred on electronic devices in a node based licensing scheme. That is, license management occurs at the local node. While embodiments of the present invention are disclosed within the context of an ATM network, other embodiments are well suited to other node based communication networks involving the transfer and management of licensing schemes.

Figure 2:
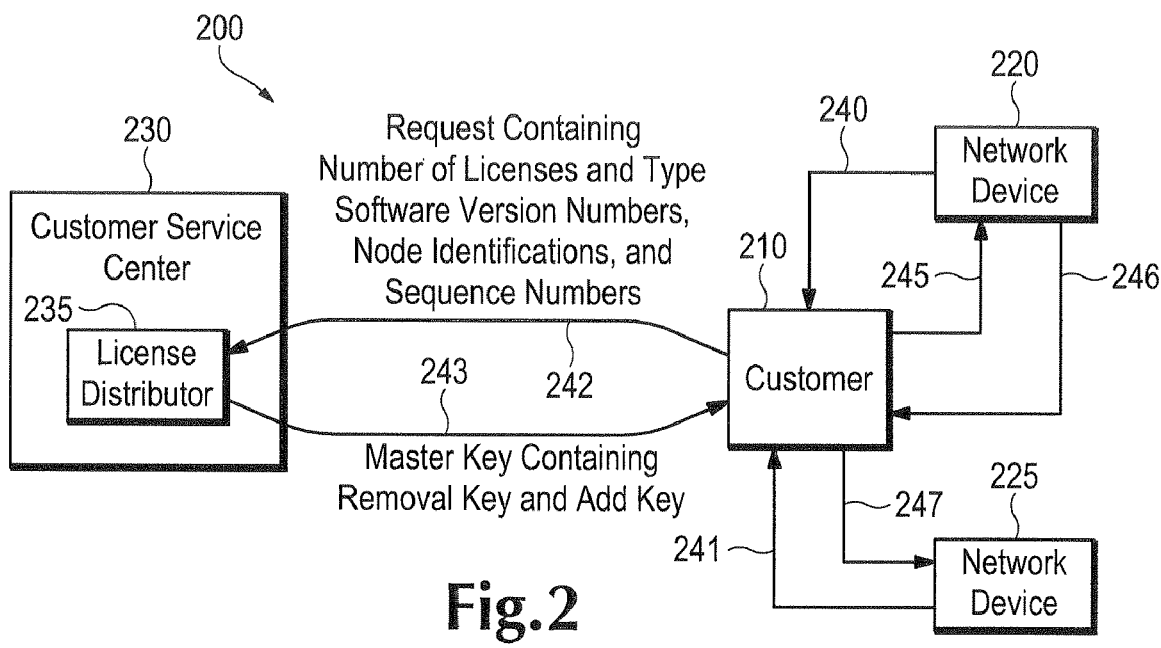
FIG. 2 is a data flow diagram illustrating the flow of information when transferring licenses between electronic devices supporting licensable features, in accordance with one embodiment of the present invention.

FIG. 2 is a flow diagram illustrating the flow of information in a localized, node based license management scheme that is capable of transferring licenses for service features (e.g., hardware, software, capabilities, etc.) between nodes (e.g., electronic device, network device, etc.), in accordance with one embodiment of the present invention. The present embodiment enables the secure transfer and management of licenses between network devices. As a result, the present embodiment flexibly accommodates licenses for both hardware and software features that are available on a network device (e.g., bandwidth, lines/ports/connections, software applications, etc.). For illustration purposes only, the embodiment of FIG. 2 is described within the context of transferring licenses between network devices. The network devices are representative of electronic devices that are capable of supporting any licensable services, such as a personal computer upon which a license is installed to enable a software, hardware, or performance feature.

The exemplary network devices 220 and 225 of FIG. 2 can be ATM network devices, such as a switch or router, or any other network device. The present embodiment is capable of transferring licenses between network device 220 and 225 even though the network devices may be off-line from any network, including the ATM network. In addition, the transfer of licenses is implemented through a localized, node based licensing management scheme, as further described below.

For example, the customer 210 (e.g., technician) is able to interface with the network devices 220 and 225 locally. That is, commands or instruction sequences are inputted directly into the network device (e.g., through a local interface or through a direct connection to the network device to enter command line interface instructions). In addition, management of licenses for each of the network devices 220 and 225 occurs locally at that network device. For instance, controller cards associated with each network device 220 and 225, respectively, manage the transfer of the license between the network device 220 and 225. In addition, each respective controller card manages licenses at that network device (e.g., manages transfer, removal, addition, installation, and allocation of licenses).

In general, path 242 describes the sending of a transfer request from the customer 210 to the customer service center 230 for the transfer of one or more licenses. The request enables the transfer of licenses from network device 220 to the network device 225, for example. In one embodiment, the request is encrypted to protect the information contained within the request. The request can be transmitted through any means. For instance, the request in a digitized, bit pattern form can be transmitted over a data line, through e-mail, fax, or through a web interface managed by the customer service center 230.

The request contains identifying information that is used to restrict the transfer of the licenses only between the network devices 220 and 225. In addition, the identifying information is able to restrict the transfer of licenses to a one-time procedure. That is, the transfer of the licenses can only occur once, and only from the network device 220 to the network device 225. In this manner, unauthorized distribution of licenses is curtailed.

The identifying information contained within the request for the transfer of licenses includes the number and type of licenses that are to be transferred, node identifiers, software version numbers, and a sequence numbers. For instance, the request may include first information that is unique to the network device 220. The first information may include a node identifier, a sequence number, and a software version all associated with the network device 220. This first information may be transferred to the customer 210 over path 240. Path 240 represents any method suitable for the customer 210 obtaining the first information. For instance, the customer 210 may obtain the first information through a direct link, or through a local interface at the network device 220. Moreover, the information in path 240 is presented off-line from the network device 220.

Second information may be included in the request that is unique to the network device 225. The second information may include a node identifier, a sequence number, and a software version all associated with the network device 225. This second information may be transferred to the customer 210 over path 241. Path 241 represents any method for the customer 210 suitable for obtaining the second information. For instance, the customer 210 may obtain the first information through a direct link, or through a local interface at the network device 225. Moreover, the information in path 241 is presented off-line from the network device 225.

For example, the request can contain a request for the transfer of one or more licenses from network device 220 to network device 225. The licenses enable hardware and software features that can be made available on either of the network devices 220 and 225. More specifically, both the network devices 220 and 225 contain service modules that each are configured with hardware and software features that are enabled via a license. These service modules are plugged into slots on a corresponding network device that communicatively couple the service modules to the system bus of the network device, for example. Some of the features are universalized and are implemented on more than one, or all, of the service modules.

As such, the request contains the number of licenses to be transferred and the type of licenses to be transferred. The node identifiers identify the nodes between which the licenses are transferred. For instance a first node identifier identifies the network device 220, and a second node identifier identifies the network device 225. As such, the licenses are transferred between network devices 220 and 225. In one embodiment, the node identifiers are serial numbers associated with the chassis that form the backbone of the network devices 220 and 225. In other embodiments, the node identifier is a unique chassis identifier, such as a MAC address, backplane serial number, etc.

The software version numbers are also associated with the network devices 220 and 225. The software version numbers for each device indicate which version of software (e.g., an operating system) is running on that device. For instance the software version may control the transfer, allocation, and usage of resources that support the network device 220 and 225.

The sequence numbers are unique numbers associated and dedicated to the network devices 220 and 225, respectively. The sequence number for the network device 220 is unique only within the network device 220. The sequence number for the network device 225 is unique only within the network device 225. In addition, the sequence numbers are used to invalidate any further transfer of the requested licenses once they have been transferred between the network devices 220 and 225. This is achieved through an incrementing of the respective sequence numbers throughout the process of transferring licenses, as fully described below in relation to FIGS. 3, 4, and 5.

The request is received at the customer service center. The customer service center 230 is able to coordinate the transfer of licenses between the network devices 220 and 225. At the customer service center 230, the license distributor 235 performs the functions necessary to transfer the requested licenses for the customer. For instance, as shown in FIG. 2, the license distributor 235 generates the master key that is used to transfer the licenses between the network devices 220 and 225. The license distributor 235 sends the master key back to the customer 210 over path 243. The master key is transmitted back to the customer via any suitable communication means. That is, the digitized, bit pattern that encodes the master key is transmitted to the customer 210 (e.g., through e-mail, customer interface, fax, packaged in a storage device, etc. and sent to the customer). In addition, the master key is encrypted using an encryption engine (not shown) to protect the information encoded within.

Figure 8:
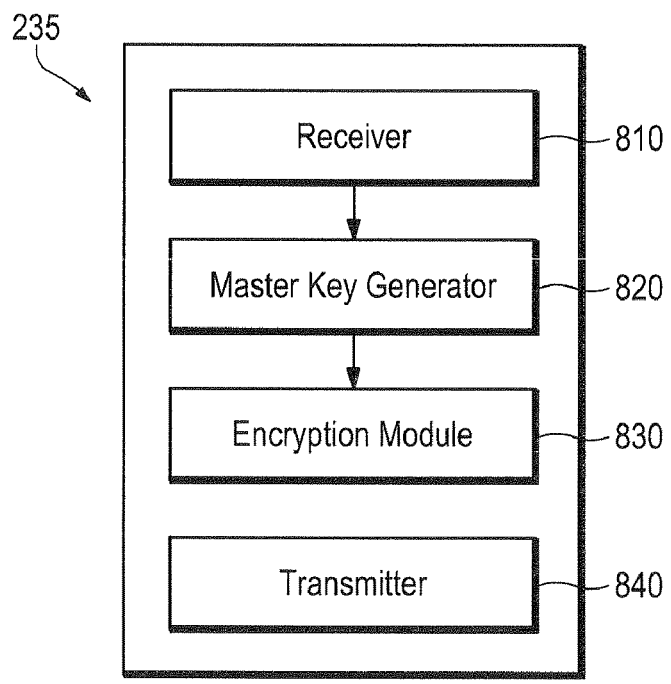
FIG. 8 is a block diagram of a license distributor that is capable of generating a master key for transferring licenses in a node based licensing scheme, in accordance with one embodiment of the present invention.

FIG. 8 is a block diagram of a license distributor 235 of FIG. 2 used to transfer licenses between electronic devices. For example, the receiver 810 receives a request from a service customer to transfer a license from a first electronic device to a second electronic device. The request contains first information unique to the first electronic device, second information unique to the second electronic device, and a license description, wherein the license enables a service feature on the first electronic device and the second electronic device. The generator 820 generates a master key that includes a removal key and an add key. The removal key includes the first information for removing the license from the first electronic device and the add key includes the second information for adding the license to said second electronic device. The encryption module 830 encrypts the master key. The transmitter 840 sends the master key to the service customer.

Portions of the master key are formatted for the software versions running on either the network device 220 or network device 225. For instance, the master key includes a removal key used to remove licenses from network device 220 and an add key for adding the transferred licenses to network device 225. As such, the removal key of the master key is formatted to the software version of the network device 220. The add key of the master key is formatted to the software version of the network device 225. The software versions are indicated in the original request. In addition to the software version number, the master key contains information identifying the licenses to be transferred (number and type of licenses), the node identifiers identifying the network devices 220 and 225, and the sequence numbers associated with each of the network devices 220 and 225.

After the master key is received by the customer 210, information in the master key is installed into the network device 220. For instance, the master key may be embedded within a command line interface or instruction sequence that is inputted into network device 220 by the customer 210 in order to transfer the licenses from the network device 220. Installation of the CLI command or instruction sequence on network device 220 is represented by path 245. Specifically, information in the removal key in the master key is used to remove the licenses from the network device 220. Provided the information in the removal key is correct, the CLI command or installation sequence removes the licenses as specified in the removal key from the network device 220.

Thereafter, the add key from the master key can be installed by the customer 210 on the network device 225, as represented by path 247. The add key is revealed in the master key after the removal of licenses from the network device 220, and retrieved by the customer 210, as represented by path 246. The add key may be embedded within a CLI instruction sequence that is inputted into network device 225 in order to add the licenses to the network device 225. Specifically, information in the add key in the master key is used to add licenses to a pool of licenses that is managed on the controller card of the network device 225. Provided the information in the add key is correct, the CLI command or installation sequence adds the licenses as specified in the add key to the network device 225.

The process illustrated in FIG. 2 provides for local, node based management of licenses at each of the network devices 220 and 225. That is, the transfer of licensees between the network device 220 and 225 occurs at the local level, at each of the network devices 220 and 225. As such, management of licenses does not require network availability (e.g., to the customer service center 230), and as such, services provided by the network devices 220 and 225 are highly available.

For example, local management of licenses ensures that service provided by the network devices 220 and 225 are minimally impacted when hardware components on the network devices fail and have to be replaced. That is, after replacement of the failed components, either of the network devices 220 or 225 is able to allocate licenses locally so that the network device can reach full service capacity in a minimal amount of time. This is because licenses are managed locally at each of the network devices 220 and 225, and interfacing with the customer service center 230 or any network wide license server is minimized or unnecessary.

In addition, local management of licenses is not impacted by the size of the network (e.g., ATM network 100). As such, the management of licenses as described in the present invention is highly scalable. That is, any number of licenses can be transferred easily using the methods as shown in FIG. 2.

Figure 3:
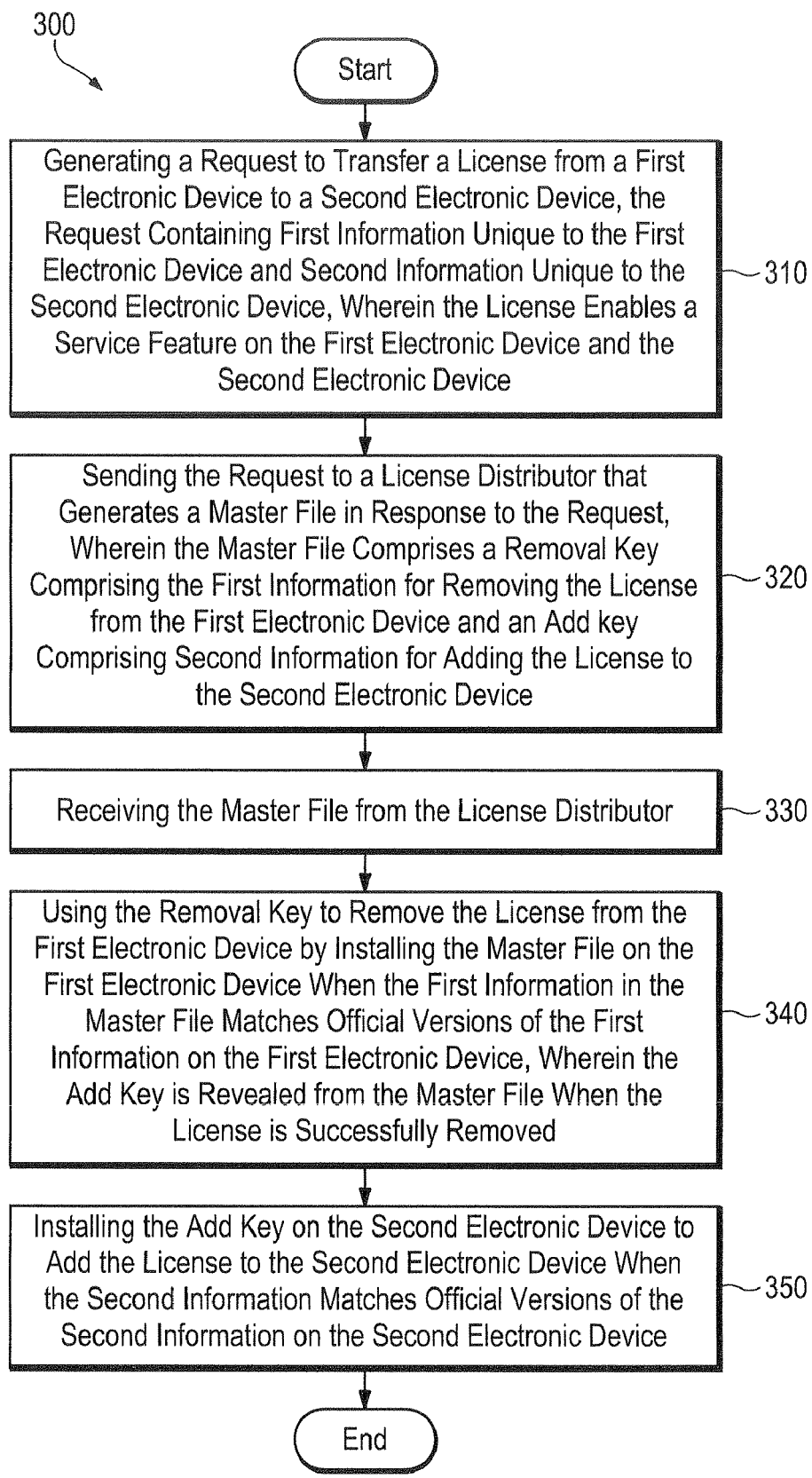
FIG. 3 is a flow diagram illustrating a method for transferring licenses between electronic devices in a node based licensing scheme, in accordance with one embodiment of the present invention.

FIG. 3 is a flow diagram 300 illustrating steps in a method for transferring licenses between electronic devices, in accordance with one embodiment of the present invention. For instance, the method of FIG. 3 illustrates the interaction between the customer 210, the license distributor 235 and the network devices 220 and 225 of FIG. 2, in one instance. In another embodiment, the method illustrated in flow diagram 300 transfers licenses between electronic devices using a localized, node based license management scheme.

While the present embodiment is described within the context of transferring licenses between electronic devices, other embodiments are well suited to transferring licenses between any device that is able to support licensable features, such as network devices that include a chassis with multiple service modules that are plugged into slots associated with the chassis.

At 310, the present embodiment generates a request to transfer a license from a first electronic device to a second electronic device. The request includes first information that is unique to the first electronic device and second information that is unique to the second electronic device. For instance, the request includes a node identifier that identifies the first electronic device. In one embodiment, the node identifier is a serial number for the chassis backplane of the first electronic device. The request also includes a node identifier that identifies the second electronic device. In one embodiment, the node identifier is a serial number for the chassis backplane of the second electronic device. Identification of the first electronic device and the second electronic device ensures that the licenses are transferred only between these two devices.

For purposes of generating the request, the present embodiment retrieves a first official node identifier stored in a first non-volatile memory. The first non-volatile memory is dedicated to the first electronic device. The first official node identifier is used as the first node identifier throughout the transfer process to ensure that the license identified in the request is only transferred from the first electronic device. In addition, the present embodiment retrieves a second official node identifier stored in a second non-volatile memory. The second non-volatile memory is dedicated to the second electronic device. The second official node identifier is used as the second node identifier throughout the transfer process to ensure that the license identified in the request is only transferred to the second electronic device.

The request also includes a description of the license that is being transferred from the first electronic device to the second electronic device. Specifically, the type of the license is included in the request to identify which license is to be transferred from the first electronic device to the second electronic device. The license enables a service feature on either or both of the first electronic device and the second electronic device.

Additionally, the request may include more than one licenses to be transferred between the first and second electronic devices. As such, necessary description of all the licenses to be transferred are included within the request. That is, the request and the master key further comprise additional information for transferring another license from the first electronic device to the second electronic device.

At 320, the present embodiment sends the request to a license distributor. The license distributor generates a master key in response to the request. The master key is used by the customer to transfer the license from the first electronic device to the second electronic device. The master key includes a removal key and an add key. The removal key includes first information that identifies the first electronic device. The first information contained in the removal key is used to remove the license from the first electronic device, as will be further described below in relation to FIG. 4. In addition, the add key includes second information that identifies the second electronic device. The information contained in the add key is used to add the license to the second electronic device, as will be further described below in relation to FIG. 5.

At 330, the present embodiment receives the master key from the license distributor. That is, in response to the request, the present embodiment receives the master key in order to implement the transfer of the license between the first electronic device and the second electronic device. Receipt of the master key occurs off-line and separate from either the first electronic device or the second electronic device. For example, as shown in FIG. 2, the customer 210 receives the master key from the license distributor 235. Thereafter, the customer 210 uses the information contained within the master key, and more specifically the removal key, to remove the license from the network device 220. In addition, the customer 210 uses the information in the master key, specifically the add key, to add the license to the network device 225.

The master key includes information necessary to transfer the license between the first electronic device and the second electronic device. That is, one or more transfer sequences uses the information in the master key to transfer the license between the first and second electronic devices. For instance, the information includes the number of licenses to be transferred, the types of each of the licenses to be transferred, the node identifiers of the first and second electronic devices, the sequence number associated with each of the first and second electronic devices, and the software versions of each of the electronic devices, as will be further described below.

As such, the master key is used to transfer one or more licenses between the first and second electronic devices. The transferred licenses are associated with one or more service features (hardware and software) that can be implemented on either of the first or second electronic devices. In still another embodiment, if the master key is encrypted, the present embodiment decrypts the master key before performing the transfer sequence at the first electronic device.

Figure 4:
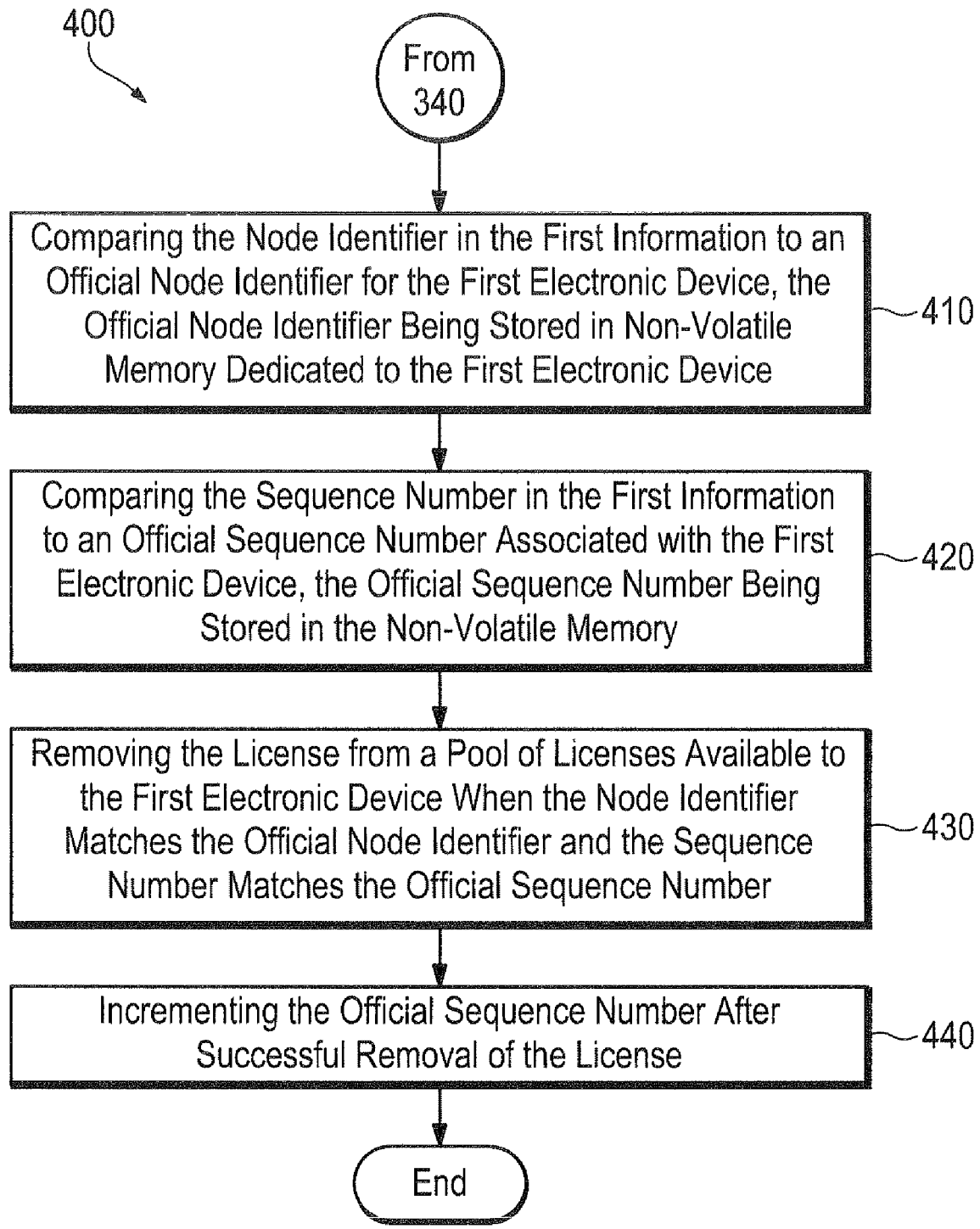
FIG. 4 is a flow diagram illustrating a method for removing a license from an electronic device using a removal key in a node based licensing scheme, in accordance with one embodiment of the present invention.

At 340, the present embodiment, uses the removal key to remove the license from the first electronic device, as is more fully described in FIG. 4. More specifically, the removal key contained within the master key is used to remove the license from the first electronic device. That is, the master key is installed on the first electronic device, and correspondingly, the removal key in the master key is also installed on the first electronic device. For example, the master key can be embedded within a CLI command or an instruction sequence that provides for the transfer (removal and addition) of licenses. The removal key is extracted and used to remove licenses from the first electronic device. Removal occurs when the first information in the removal key in the master key matches official versions of the first information stored on the first electronic device. After successful removal of the license, the add key is revealed from the master key.

For example, the master key can be provided directly to the first electronic device in an instruction sequence to transfer the license. As such, the master key contains information that is used during a transfer sequence implemented on both the first and second electronic devices. For example, the customer 210 can install the master key into the network device 220 of FIG. 2 through a command line interface in a CLI command at the device 220 that starts the transfer process. The removal key is extracted from the master key and is used to remove the license from the device 220. Provided the information in the master key is correct, the transfer instruction sequence transfers the license provided in the master key from the first electronic device to the second electronic device.

Figure 5:
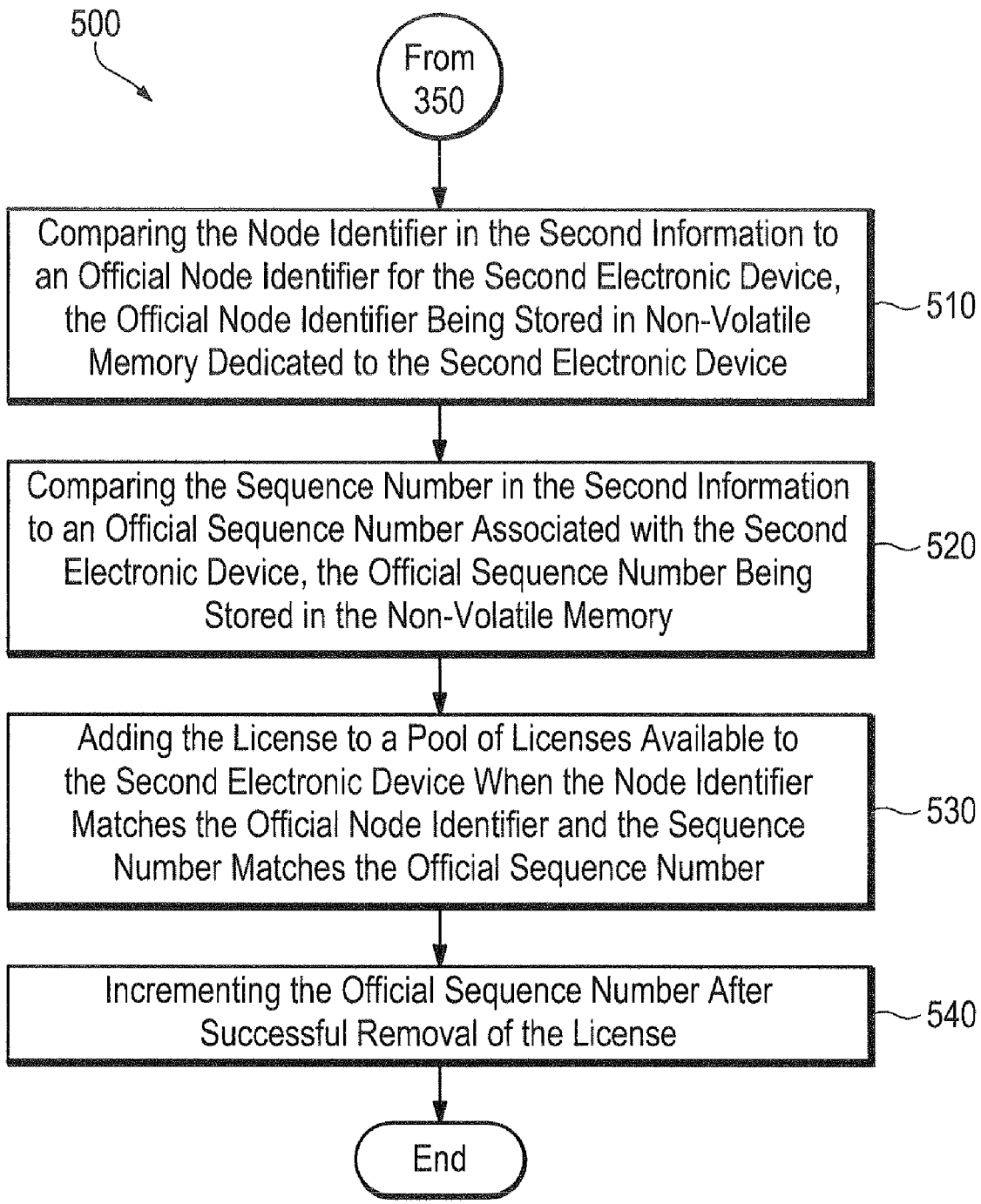
FIG. 5 is a flow diagram illustrating a method for adding a license to an electronic device using an add key in a node based licensing scheme, in accordance with one embodiment of the present invention.

At 350, the present embodiment installs the add key on the second electronic device to add the license to the second electronic device, as more fully described below in relation to FIG. 5. That is, the same or another customer can install the information in the add key to add the license to the second electronic device. The addition of the license occurs when the second information matches official versions of the second information on the second electronic device. As a result, the transfer process is completed when the license is removed from the first electronic device and added to the second electronic device. The service feature associated with the license can then be implemented on the second electronic device through a corresponding service module that includes a controller card.

FIG. 4 is a flow diagram 400 illustrating steps in a method for removing a license at a first electronic device from which the license is being transferred, in accordance with one embodiment of the present invention. The method of flow diagram 400 is a further illustration of 340 in FIG. 3 to begin the transfer process. As such, the first information in the removal key is used to remove the license from the first electronic device. More specifically, the first information obtained from the master key includes the license to be removed (e.g., its license type), the node identifier of the first electronic device, the sequence number associated with the first electronic device, and the software version of the first electronic device.

At 410, the present embodiment compares the node identifier in the first information to an official node identifier for the first electronic device. The official node identifier is stored in non-volatile memory dedicated to the first electronic device. For instance, the official node identifier is the serial number of the chassis that provides the backplane for service modules that support the first electronic device. The service modules are plugged into slots of the chassis that communicatively couple each of the service modules to system bus of the first electronic device. The official node identifier uniquely identifies the first electronic device. As such, the node identifier ensures that the license is removed from only the first electronic device, and not any other devices. In addition, the official node identifier of the chassis should/may be stored in a tamper proof device to prevent duplication, in accordance with one embodiment. In another embodiment, the official node identifier is encrypted or rendered tamper proof to prevent misuse of the official node identifier.

At 420, the present embodiment compares the sequence number in the first information to an official sequence number that is associated with the first electronic device. The official sequence number is maintained at the electronic device and is also stored in the non-volatile memory dedicate to the first electronic device. The official sequence number is used to ensure that removal of the license using the removal key is performed once, as tied to the official sequence number. That is, once the license is removed from the first electronic device, the removal key becomes invalid, through a change in the official sequence number.

At 430, the present embodiment removes the license from a pool of licenses available to the first electronic device when the node identifier matches the official node identifier and the sequence number matches the official sequence number. That is, the removal occurs when the node identifier in the removal key matches the official node identifier, and in combination when the sequence number in the removal key matches the official sequence number. Licenses are available for removal only if they are not currently being allocated to a slot in the first electronic device, in one embodiment.

The pool of licenses is managed locally (e.g., by the controller card of the electronic device). In one embodiment, the pool of licenses is tied to the first electronic device using the official node identifier. The license pool contains licenses that are available to service modules implemented within the first electronic device. Localized management of licenses on the first electronic device is managed through the pool of licenses. For instance, licenses from the pool are allocated to slots on the first electronic device such that any service module installed or plugged into a corresponding slot may enable a service feature associated with that license.

The present embodiment aborts the removal of the license when the node identifier in the removal key and the official node identifier do not match. In addition, the present embodiment aborts the removal of the license when the sequence number in the removal key and the official sequence number do not match. That is, anytime either the node identifier or the sequence number do not match their respective official versions, the removal of the license on the first electronic device is aborted.

In another embodiment, the removal of the license is aborted when the license pool in the first electronic device does not include the requisite license or licenses as specified in the removal key. That is, in the case of a single license being transferred from the first electronic device, the license pool either does not include the license, or does not include the license in a state ready for removal. For instance, if the license is currently being allocated to a slot in the chassis of the first electronic device, that license is not removable. In the case where multiple licenses are to be transferred, the removal of the licenses is aborted when the license pool in the first electronic device does not include the specific licenses as specified in the removal key, or does not include enough of the licenses in a state available for removal, such as not being allocated to a slot.

To provide further security, the present embodiment compares the software version contained in the removal key to the official software version number of the first electronic device. The official software version number may be embedded into the software itself, and may or may not be stored in the non-volatile memory dedicated to the electronic device. Moreover, if the software version number in the removal key matches the official software version number of the electronic device, then the present embodiment removes the license from the pool of licenses. However, if the software version number in the removal key does not match the official software version number of the first electronic device, then the removal is aborted. In one embodiment, the official software version selects the secret key that is used to decrypt the removal key. That is, the secret key used to decrypt the removal key is selected based on the official software version of the first electronic device.

Once the license has been successfully removed from the pool of licenses available to the first electronic device, the official sequence number is incremented to change the official sequence number. This makes the removal key in the master key as identified by its sequence number unusable for any subsequent removal of the license on the first electronic device. As such, the combination of the official node identifier and the official sequence number ensures that the removal in the transfer process occurs once and only at the first electronic device. In one embodiment, the official sequence number should/may be stored in a tamper proof location to prevent reusing the removal key. In another embodiment, the official sequence number is encrypted or rendered tamper proof to prevent misuse of the official sequence number.

After successful removal of the license from the first electronic device, the add key is revealed from the master key. As such, the add key can be used to complete the transfer process and add, or install, the license onto the second electronic device. FIG. 5 is a flow diagram 500 illustrating steps in a method for adding a license to the second electronic device from which the license is being transferred, in accordance with one embodiment of the present invention. The method of flow diagram 500 is a further illustration of 350 in FIG. 3 to end the transfer process. As such, the second information in the add key is used to add the license to the second electronic device. More specifically, the second information obtained from the add key in the master key includes the license to be added (e.g., its license type), the node identifier of the second electronic device, the sequence number associated with the second electronic device, and the software version of the second electronic device.

For example, the add key can be provided directly to the second electronic device in an instruction sequence to transfer the license. For example, in relation to FIG. 2, the customer 210 can install the add key into the network device 225 of FIG. 2 through a command line interface in a CLI command at the device 225 that ends the transfer process. The add key is used to add the license to the device 225.

At 510, the present embodiment compares the node identifier in the second information to an official node identifier for the second electronic device. The official node identifier is stored in non-volatile memory dedicated to the second electronic device. For instance, the official node identifier is the serial number of the chassis that provides the backplane for service modules that support the second electronic device. The service modules are plugged into slots of the chassis that communicatively couple each of the service modules to system bus of the second electronic device. The official node identifier uniquely identifies the second electronic device. As such, the node identifier ensures that the license is added or installed only to the second electronic device, and not any other devices. In addition, the official node identifier of the chassis should/may be stored in a tamper proof device to prevent duplication, in accordance with one embodiment. In another embodiment, the official node identifier is encrypted or rendered tamper proof to prevent misuse of the official node identifier.

At 520, the present embodiment compares the sequence number in the second information to an official sequence number that is associated with the second electronic device. The official sequence number is maintained at the second electronic device and is also stored in the non-volatile memory dedicated to the second electronic device. The official sequence number is used to ensure that addition of the license using the add key is performed once, as tied to the official sequence number. That is, once the license is added to the second electronic device, the add key becomes invalid, through a change in the official sequence number.

At 530, the present embodiment adds the license to a pool of licenses available to the second electronic device when the node identifier matches the official node identifier and the sequence number matches the official sequence number. That is, addition occurs when the node identifier in the add key matches the official node identifier, and in combination when the sequence number in the add key matches the official sequence number.

The pool of licenses is managed locally (e.g., by the controller card of the second electronic device). In one embodiment, the pool of licenses is tied to the second electronic device using the official node identifier. The license pool contains licenses that are available to service modules implemented within the second electronic device. Localized management of licenses on the second electronic device is managed through the pool of licenses. For instance, licenses from the pool are allocated to slots on the second electronic device such that any service module installed or plugged into a corresponding slot may enable a service feature associated with that license.

The present embodiment aborts the addition of the license when the node identifier in the add key and the official node identifier do not match. In addition, the present embodiment aborts the addition of the license when the sequence number in the add key and the official sequence number do not match. That is, anytime either the node identifier or the sequence number do not match their respective official versions, the addition of the license on the second electronic device is aborted.

To provide further security, the present embodiment compares the software version contained in the add key to the official software version number of the second electronic device. The official software version number is embedded within the software, and may or may not be stored in the non-volatile memory dedicated to the second electronic device. Moreover, if the software version number in the add key matches the official software version number of the electronic device, then the present embodiment adds the license to the pool of licenses. However, if the software version number in the add key does not match the official software version number of the second electronic device, then the addition is aborted. In one embodiment, the official software version selects the secret key that is used to decrypt the add key. That is, the secret key used to decrypt the add key is selected based on the official software version of the second electronic device.

Once the license has been successfully added and transferred to the pool of licenses available to the second electronic device, the official sequence number is incremented to change the official sequence number. This makes the add key in the master key as identified by its sequence number unusable for any subsequent addition of the license on the second electronic device. As such, the combination of the official node identifier and the official sequence number ensures that the addition in the transfer process occurs once and only at the second electronic device. In one embodiment, the official sequence number should/may be stored in a tamper proof location to prevent reusing the add key. In another embodiment, the official sequence number is encrypted or rendered tamper proof to prevent misuse of the official sequence number.

Figure 6:
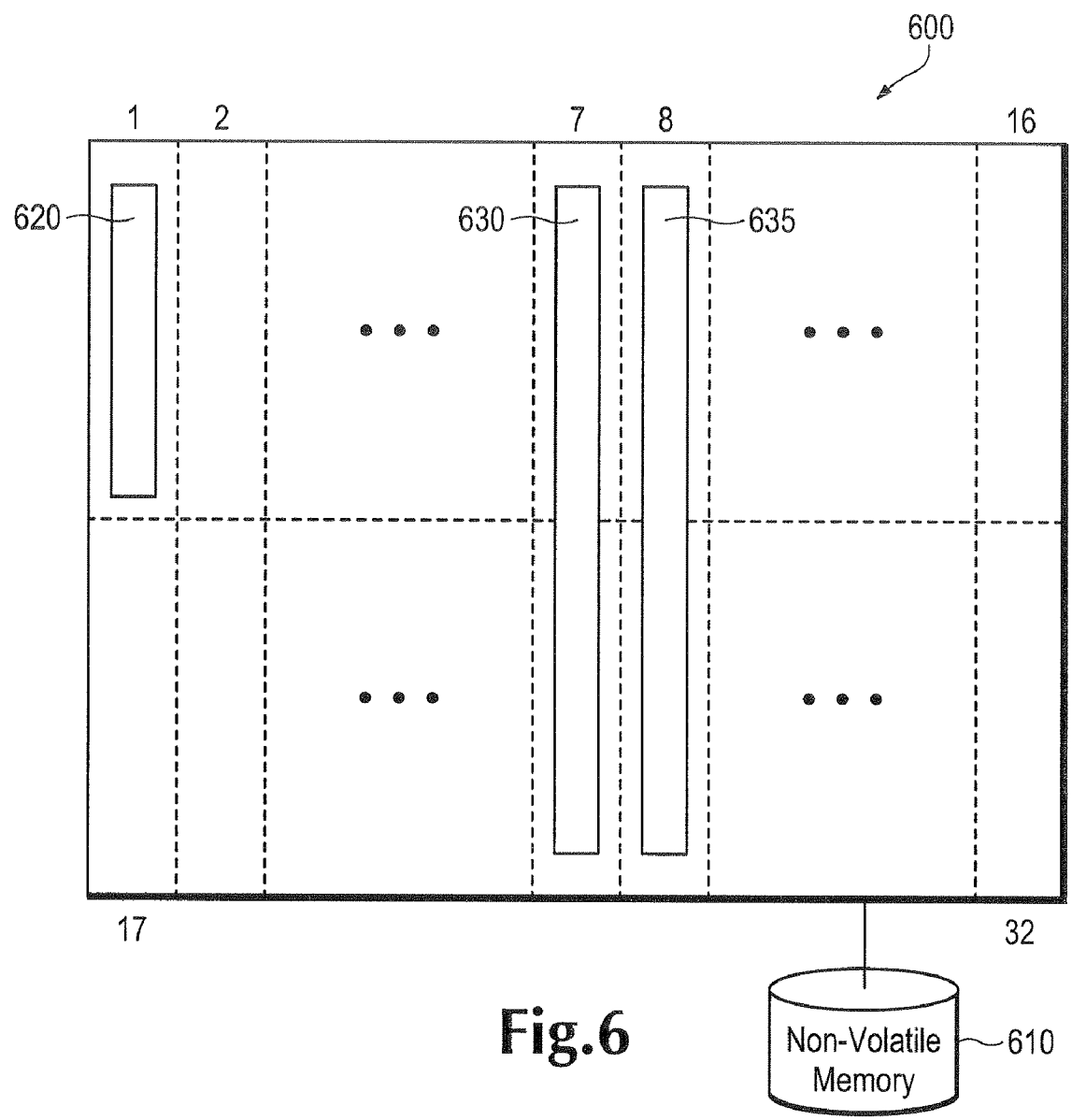
FIG. 6 is a block diagram of a chassis for a network device that is capable of locally managing and transferring licenses in a node based licensing scheme, in accordance with one embodiment of the present invention.

FIG. 6 is a block diagram of an electronic device 600 which is capable of managing licenses locally for the local transfer of a license from or to the electronic device 600, in accordance with one embodiment of the present invention. That is, the electronic device is able to remove a license from use by the electronic device 600, or add a license for use by the electronic device 600. The electronic device 600 is capable of supporting features that are activated through licenses as enabled by service modules installed on slots in the electronic device 600. In one embodiment, the electronic device is a network device, such as a switch. As such, the electronic device 600 is capable of off-line transfer (removal or addition) of licenses.

The electronic device 600 includes a chassis of a backplane that supports the electronic device. In one embodiment, the electronic device is a node in an associated ATM, or any other, network. For instance, the electronic device 600 is representative of either the network devices 220 or 225 in FIG. 2. In addition, the electronic device 600 comprises a non-volatile memory 610, a plurality of service modules that are plugged into slots (e.g., 1-32) of the chassis backplane. The service models (e.g., module 620) provide hardware, software and performance features that are enabled with licenses, for instance.

The non-volatile memory 610 is dedicated to the chassis backplane of the electronic device 600. That is, the chassis comes equipped with the non-volatile memory 610 and is dedicated to the chassis, and integrated into the chassis. In one embodiment, the non-volatile memory is tamper proof.

In one embodiment, the non-volatile memory stores an official sequence number and an official node identifier for the electronic device 600. As described previously, the official node identifier may define the electronic device 600. In one embodiment, the node identifier is the serial number of the chassis backplane associated with the electronic device 600. The official sequence number is maintained at the non-volatile memory 610 to ensure that transfer of licenses correspond to a request for the transfer of those licenses that contain the same sequence numbers for both the devices from which the licenses are being transferred and to which the license is being transferred, as previously described.

As shown in FIG. 6, the controller modules 630 and 635 are identical, and perform identically. The controller modules 630 and 635 are coupled to the non-volatile memory 610. One controller module is used for backup purposes. One of the functions of the controller modules 630 and 635 is to manage the pool of licenses that is available to the electronic device 600. As such, the active controller module (630 or 635) receives the master key, removal key, or add key comprising a license for a service feature, a node identifier associated with node to which the license is removed or added, and a sequence number associated with the node to which the license is being removed or added. In one embodiment, the master key, removal key, or add key is formatted to a software version of the electronic device, as described previously.

Figure 7:
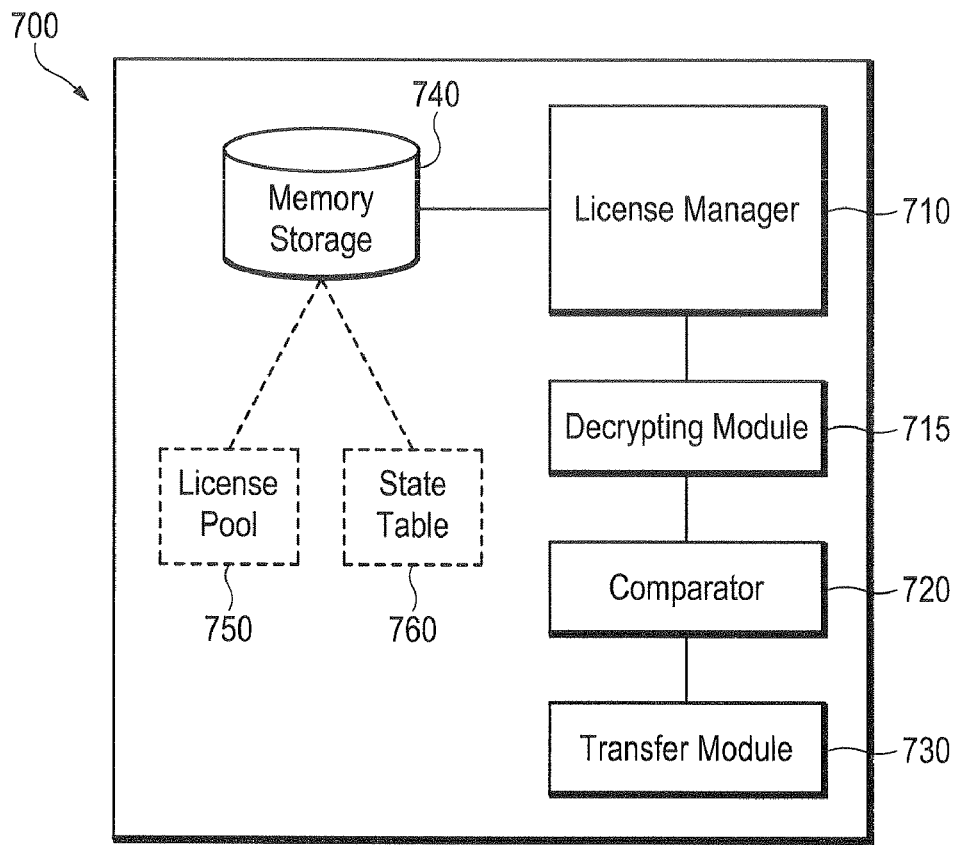
FIG. 7 is a block diagram of a controller that is capable of transferring licenses at a network device in a node based licensing scheme, in accordance with one embodiment of the present invention.

FIG. 7 is a block diagram of a controller module 700 (e.g., controller module 630 or 635 of FIG. 6), in accordance with one embodiment of the present invention. The controller module 700 comprises a license manager 710, a comparator 720, a transfer module 730, a memory storage 740, a license pool 750, and a state table 760.

The license manager 710 manages a pool of licenses 750 available to an associated electronic device (e.g., device 600 of FIG. 6). The license manager is capable of transferring and allocating licenses to slots on the electronic device. The allocated licenses enable corresponding service features on service modules plugged into those slots.

More specifically, in one embodiment, the license is allocated to a particular slot on the electronic device. The license enables a service feature associated with the license on any service module installed (e.g., plugged in) in that slot. For instance, in one embodiment, the controller card manages the pool of licenses. Also, in one embodiment, the pool of licenses is maintained on the controller card. The controller card allocates licenses in the pool of licenses to the slots in the electronic device. Any service module that is installed, or plugged, into that slot can enable the associated service feature corresponding to the license. The service module is plugged into one or more slots in the electronic device to communicatively couple the service module to the system bus of the electronic device in order to utilize the service features.

In addition, a license can be deallocated from a slot when the corresponding service module no longer needs the license. That is, the application is no longer being used on the service module. In this case, the license is returned to the pool of licenses, and the license is again available for allocation to any of the slots on the electronic device.

As a result, a localized, node based licensing scheme is implemented. Localized management of licenses provides for less reliance on a centralized license management scheme that manages the transfer of licenses for the electronic device. In this manner, the electronic device can provide services much more quickly since a centralized license manager is not required for the transfer of licenses.

Localized management of the licenses is implemented through a license pool 750 and a state table 760 that is contained within memory storage 740 dedicated to the controller module 700. The memory storage 740 can be a hard disk drive, or non-volatile memory, or any other suitable combination of memory types. As stated previously, the license pool 750 contains licenses that are available to service modules implemented within the electronic device. That is, in the transfer process, licenses can be removed or added to the license pool 750 in a localized management scheme.

In one embodiment, the license pool is managed locally by the license manager 710 using a state table 760. To illustrate an exemplary state table 760, Table 1 provides the information contained in the state table 760. The state table 760 stores states of licenses in the pool of licenses 750. The columns in Table 1 define the license type (e.g., "License Type"), the quantity of installed licenses available for the electronic device (e.g., "Installed Quantity"), and the number of licenses of that type that are allocated (e.g., "Allocated Quantity"). For instance, one type of license may provide a feature on the electronic device that enables multiplexing, channelization, etc.

TABLE 1

| State Table of FIG. 7 | | |
|---|---|---|
| License Type | Installed Quantity | Allocated Quantity |
| Type A | 4 | 2 |
| Type B | 2 | 0 |
| Type C | 1 | 1 |
| Type D | 5 | 0 |

In one embodiment, removal of a license is reflected in the state table of FIG. 7. That is, the license is removed from the state table of FIG. 7 and can no longer be implemented within the electronic device associated with the state table of FIG. 7. In another embodiment, the addition of a license is reflected in the state table of FIG. 7. That is, the license is added to the state table of FIG. 7 and can be implemented within the electronic device associated with the state table of FIG. 7. In addition, the license manager can create a configuration of the licenses used in the electronic device. The configuration is stored in the memory storage 740.

In one embodiment, the license manager 710 receives the master key, removal key, and/or add key as an input for the transfer of licenses to the license pool 750. Each of the keys is encrypted, and decrypted using decrypting module 715. A secret key, as selected based on the software version used by the electronic device, is used by the decrypting module 715 to decrypt the master key, removal key, or add key. As stated previously, each of these keys contains information that is used to restrict the transfer of licenses only to an identified electronic device through a node identifier. Also, these keys can only be used only once, as regulated by corresponding sequence numbers on the electronic devices involved in the transfer process.

The comparator 720 compares the node identifier contained in a removal or add key that is used to transfer licenses to an official node identifier for the electronic device. As described previously, the official node identifier is stored in the non-volatile memory (e.g., 610 of FIG. 6) dedicated to the node, electronic device. The comparator 720 also compares the sequence number in the master key, removal key, or add key to an official sequence number stored at the non-volatile memory.

In addition, the transfer module 730 is used to transfer the license to and from the pool of licenses 750 when the node identifier and the sequence number in the corresponding master key, removal key, or add key matches their respective official versions.

Accordingly, various embodiments of the present invention disclose a method and system for transferring hardware and software licenses between electronic devices capable of supporting licensable features. Embodiments of the present invention provide for the prevention of unauthorized use of a license, for example multiple uses of a single license. In addition, localized management of licenses at an electronic device as disclosed by embodiments of the present invention facilitate a pay-as-you grow model for installing future licenses on an electronic device.

While the methods of embodiments illustrated in flow diagrams 300, 400, and 500 show specific sequences and quantity of steps, the present invention is suitable to alternative embodiments. For example, not all the steps provided for in the method are required for the present invention. Furthermore, additional steps can be added to the steps presented in the present embodiment. Likewise, the sequences of steps can be modified depending upon the application.

Embodiments of the present invention, a method and system for transferring licenses between electronic devices are described. While the invention is described in conjunction with the preferred embodiments, it is understood that they are not intended to limit the invention to these embodiments. On the contrary, the invention is intended to cover alternatives, modifications and equivalents, which may be included within the spirit and scope of the invention as defined by the appended claims. Furthermore, in the detailed description of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the present invention.

What is claimed is:

1. A method for transferring licenses between devices, comprising:
    generating a request to transfer a license from a first electronic device to a second electronic device, said request comprising first information unique to said first electronic device, second information unique to said second electronic device, and a license description, wherein said license enables a service feature on said first electronic device and said second electronic device;
    sending said request to a license distributor that generates a master key in response to said request, wherein said master key comprises a removal key comprising said first information for removing said license from said first electronic device and an add key comprising said second information for adding said license to said second electronic device;
    receiving said master key from said license distributor; using said removal key to remove said license from said first electronic device by installing said master key on said first electronic device when said first information in said master key matches official versions of said first information on said first electronic device, wherein said add key is revealed from said master key when said license is successfully removed; and
    installing said add key on said second electronic device to add said license to said second electronic device when said second information matches official versions of said second information on said second electronic device.

2. The method of claim 1, wherein said using said removal key to remove said license further comprises:
    comparing a node identifier in said first information to an official node identifier for said first electronic device, said official node identifier stored in a non-volatile memory dedicated to said first electronic device;
    comparing a sequence number in said first information to an official sequence number associated with said first electronic device, said official sequence number stored in said non-volatile memory;
    removing said license from a pool of licenses available to said first electronic device when said node identifier matches said official node identifier and said sequence number matches said official sequence number; and
    incrementing said official sequence number after successful removal of said license.

3. The method of claim 2 further comprising:
    comparing a software version in said first information to an official software version for said first electronic device that is stored in said non-volatile memory; and
    removing said license from said pool of licenses when said software version matches said official software version.

4. The method of claim 2, further comprising:
    comparing a software version in said second information to an official software version for said second electronic device that is stored in said non-volatile memory; and
    adding said license to said pool of licenses when said software version matches said official software version.

5. The method of claim 2, wherein said node identifier comprises a serial number for a chassis backplane of said first electronic device.

6. The method of claim 1, wherein said installing said add key further comprises:
    comparing a node identifier in said second information to an official node identifier for said second electronic device, said official node identifier stored in non-volatile memory dedicated to said second electronic device;
    comparing a sequence number in said second information to an official sequence number associated with said second electronic device, said official sequence number stored in said non-volatile memory;
    adding said license to a pool of licenses available to said second electronic device when said node identifier matches said official node identifier and said sequence number matches said official sequence number; and
    incrementing said second sequence number after successful transfer of said license to said pool of licenses.

7. The method of claim 6, wherein said node identifier comprises a serial number for a chassis backplane of said second electronic device.

8. The method of claim 1, wherein said generating a request comprises:
retrieving a first official node identifier stored in first non-volatile memory dedicated to said first electronic device, said official node identifier used as said first node identifier; and
retrieving a second official node identifier stored in second non-volatile memory dedicated to said second electronic device, said second official node identifier used as said second node identifier.

9. The method of claim 1, wherein said sending said request further comprises:
presenting off-line from said first electronic device and said second electronic device said request in an encrypted form.

10. The method of claim 1, wherein said request and said master key further comprises additional information for transferring another license from said first electronic device to said second electronic device.

11. The method of claim 1, further comprising: aborting removal of said license when said first information in said master key does not match official versions of said first information.

12. The method of claim 1, further comprising: aborting removal of said license when said license is not available for removal in a license pool associated with said first electronic device.

13. The method of claim 1, further comprising: aborting adding said license to said second electronic device when said second information in said add file does not match official versions of said second information.

14. The method of claim 1, wherein said first electronic device and said second electronic device are network devices.

15. A method for off-line transfer of licenses between electronic devices, comprising:
receiving a request from a service customer to transfer a license from a first electronic device to a second electronic device, said request containing first information unique to said first electronic device, second information unique to said second electronic device, and a license description, wherein said license enables a service feature on said first electronic device and said second electronic device;
generating a master key, wherein said master key comprises a removal key comprising said first information for removing said license from said first electronic device and an add key comprising said second information for adding said license to said second electronic device;
formatting said removal key according to a first software version operating on said first electronic device, said first software version included within said request; and
formatting said add key according to a second software version operating on said second electronic device, said second software version included within said request;
encrypting said master key; and
sending said master key to said service customer.

16. The method of claim 15, wherein said receiving a request further comprises: receiving said request through a web interface off-line from said first electronic device and said second electronic device.

17. The method of claim 15, wherein said first information comprises a first node identifier, a first sequence number, and a software version all associated with said first electronic device, and wherein said second information comprises a second node identifier, a second sequence number, and a second software version all associated with said second electronic device.

18. A computer readable medium containing executable instructions which, when executed in a processing system, causes the system to perform a method for transferring licenses between devices, comprising:
generating a request to transfer a license from a first electronic device to a second electronic device, said request containing first information unique to said first electronic device, second information unique to said second electronic device, and a license description, wherein said license enables a service feature on said first electronic device and said second electronic device;
sending said request to a license distributor that generates a master key in response to said request, wherein said master key comprises a removal key comprising said first information for removing said license from said first electronic device and an add key comprising said second information for adding said license to said second electronic device;
receiving said master key from said license distributor;
using said removal key to remove said license from said first electronic device by installing said master key on said first electronic device when said first information in said master key matches official versions of said first information on said first electronic device, wherein said add key is revealed from said master key when said license is successfully removed; and
installing said add key on said second electronic device to add said license to said second electronic device when said second information matches official versions of said second information on said second electronic device.

19. The computer readable medium of claim 18, wherein said using said removal key to remove said license in said method further comprises instructions for performing:
comparing a node identifier in said first information to an official node identifier for said first electronic device, said official node identifier stored in a non-volatile memory dedicated to said first electronic device;
comparing a sequence number in said first information to an official sequence number associated with said first electronic device, said official sequence number stored in said non-volatile memory;
removing said license from a pool of licenses available to said first electronic device when said node identifier matches said official node identifier and said sequence number matches said official sequence number; and
incrementing said official sequence number after successful removal of said license.

20. The computer readable medium of claim 19, further comprising instructions for performing: comparing a software version in said first information to an official software version for said first electronic device that is stored in said non-volatile memory; and
removing said license from said pool of licenses when said software version matches said official software version.

21. The computer readable medium of claim 19, further comprising instructions for performing: comparing a software version in said second information to an official software version for said second electronic device that is stored in said non-volatile memory; and
adding said license to said pool of licenses when said software version matches said official software version.

22. The computer readable medium of claim 19, wherein said node identifier comprises a serial number for a chassis backplane of said first electronic device.

23. The computer readable medium of claim 18, wherein said installing said add key in said method further comprises instructions for performing:
- comparing a node identifier in said second information to an official node identifier for said second electronic device, said official node identifier stored in non-volatile memory dedicated to said second electronic device;
- comparing a sequence number in said second information to an official sequence number associated with said second electronic device, said official sequence number stored in said non-volatile memory;
- adding said license to a pool of licenses available to said second electronic device when said node identifier matches said official node identifier and said sequence number matches said official sequence number; and
- incrementing said second sequence number after successful transfer of said license to said pool of licenses.

24. The computer readable medium of claim 23, wherein said node identifier comprises a serial number for a chassis backplane of said second electronic device.

25. The computer readable medium of claim 18 wherein said generating a request comprises instructions for performing:
- retrieving a first official node identifier stored in first non-volatile memory dedicated to said first electronic device, said official node identifier used as said first node identifier; and
- retrieving a second official node identifier stored in second non-volatile memory dedicated to said second electronic device, said second official node identifier used as said second node identifier.

26. A computer system for transferring licenses between devices, comprising:
- means for generating a request to transfer a license from a first electronic device to a second electronic device, said request containing first information unique to said first electronic device, second information unique to said second electronic device, and a license description, wherein said license enables a service feature on said first electronic device and said second electronic device;
- means for sending said request to a license distributor that generates a master key in response to said request, wherein said master key comprises a removal key comprising said first information for removing said license from said first electronic device and an add key comprising said second information for adding said license to said second electronic device;
- means for receiving said master key from said license distributor; means for using said removal key to remove said license from said first electronic device by installing said master key on said first electronic device when said first information in said master key matches official versions of said first information on said first electronic device, wherein said add key is revealed from said master key when said license is successfully removed;
- means for installing said add key on said second electronic device to add said license to said second electronic device when said second information matches official versions of said second information on said second electronic device; and
- a monitor device for displaying that the transferring licenses has been completed.

27. The system of claim 26, further comprising:
- means for comparing a node identifier in said first information to an official node identifier for said first electronic device, said official node identifier stored in a non-volatile memory dedicated to said first electronic device;
- means for comparing a sequence number in said first information to an official sequence number associated with said first electronic device, said official sequence number stored in said non-volatile memory;
- means for removing said license from a pool of licenses available to said first electronic device when said node identifier matches said official node identifier and said sequence number matches said official sequence number; and
- means for incrementing said official sequence number after successful removal of said license.

28. The system of claim 27, further comprising:
- means for comparing a software version in said first information to an official software version for said first electronic device that is stored in said non-volatile memory; and
- means for removing said license from said pool of licenses when said software version matches said official software version.

29. The system of claim 27, further comprising instructions for performing: means for comparing a software version in said second information to an official software version for said second electronic device that is stored in said non-volatile memory; and
- means for adding said license to said pool of licenses when said software version matches said official software version.

30. The system of claim 27, wherein said node identifier comprises a serial number for a chassis backplane of said first electronic device.

31. The system of claim 26, wherein said installing said add key further comprises:
- means for comparing a node identifier in said second information to an official node identifier for said second electronic device, said official node identifier stored in non-volatile memory dedicated to said second electronic device;
- means for comparing a sequence number in said second information to an official sequence number associated with said second electronic device, said official sequence number stored in said non-volatile memory;
- means for adding said license to a pool of licenses available to said second electronic device when said node identifier matches said official node identifier and said sequence number matches said official sequence number; and
- means for incrementing said second sequence number after successful transfer of said license to said pool of licenses.

32. The system of claim 31, wherein said node identifier comprises a serial number for a chassis backplane of said second electronic device.

33. The system of claim 26, wherein said means for generating a request comprises:
- means for retrieving a first official node identifier stored in first non-volatile memory dedicated to said first electronic device, said official node identifier used as said first node identifier; and
- means for retrieving a second official node identifier stored in second non-volatile memory dedicated to said second electronic device, said second official node identifier used as said second node identifier.

34. A computer readable medium containing executable instructions which, when executed in a processing system, causes the system to perform a method for off-line transfer of licenses between electronic devices, comprising:
- receiving a request from a service customer to transfer a license from a first electronic device to a second electronic device, said request containing first information unique to said first electronic device, second information unique to said second electronic device, and a license description, wherein said license enables a service feature on said first electronic device and said second electronic device;

generating a master key, wherein said master key comprises a removal key comprising said first information for removing said license from said first electronic device and an add key comprising said second information for adding said license to said second electronic device;

formatting said removal key according to a first software version operating on said first electronic device, said first software version included within said request; and formatting said add key according to a second software version operating on said second electronic device, said second software version included within said request;

encrypting said master key; and sending said request to said service customer.

35. The computer readable medium of claim 34, wherein said receiving a request further comprises instructions for performing:

receiving said request through a web interface off-line from said first electronic device and said second electronic device.

36. The computer readable medium of claim 34, wherein said first information comprises a first node identifier, a first sequence number, and a software version all associated with said first electronic device, and wherein said second information comprises a second node identifier, a second sequence number, and a second software version all associated with said second electronic device.

37. A computer system for off-line transfer of licenses between electronic devices, comprising:

means for receiving a request from a service customer to transfer a license from a first electronic device to a second electronic device, said request containing first information unique to said first electronic device, second information unique to said second electronic device, and a license description, wherein said license enables a service feature on said first electronic device and said second electronic device;

means for generating a master key, wherein said master key comprises a removal key comprising said first information for removing said license from said first electronic device and an add key comprising said second information for adding said license to said second electronic device;

means for formatting said removal key according to a first software version operating on said first electronic device, said first software version included within said request; and means for formatting said add key according to a second software version operating on said second electronic device, said second software version included within said request;

means for encrypting said master key;

means for sending said request to said service customer; and a monitor device for displaying that the transfer of licenses has been completed.

38. The system of claim 37, wherein said receiving a request further comprises instructions for performing:

means for receiving said request through a web interface off-line from said first electronic device and said second electronic device.

39. The system of claim 37, wherein said first information comprises a first node identifier, a first sequence number, and a software version all associated with said first electronic device, and wherein said second information comprises a second node identifier, a second sequence number, and a second software version all associated with said second electronic device.

40. A system for off line transfer of licenses between electronic devices, comprising:

a receiver for receiving a request from a service customer to transfer a license from a first electronic device to a second electronic device, said request containing first information unique to said first electronic device, second information unique to said second electronic device, and a license description, wherein said license enables a service feature on said first electronic device and said second electronic device;

a generator for generating a master key, wherein said master key comprises a removal key comprising said first information for removing said license from said first electronic device and an add key comprising said second information for adding said license to said second electronic device, wherein the removal key is formatted according to a first software version operating on said first electronic device and said first software version is included within said request, and wherein said add key is formatted according to a second software version operating on said second electronic device and said second software version is included within said request;

an encryptor for encrypting said master key; and a transmitter for sending said request to said service customer.

41. An electronic device that is capable of off-line transfer of licenses, comprising:

a non-volatile memory dedicated to a chassis of said electronic device, said non-volatile memory storing an official sequence number and an official node identifier for said electronic device;

a controller module coupled to said non-volatile memory for enabling the transfer of a license, wherein said controller module receives node identifier information and sequence number information in a key for transferring said license, said controller module further comprising:

a license manager for managing a pool of licenses available to said electronic device; a comparator for comparing said node identifier information to said official node identifier and said sequence number information to said official sequence number; and a transfer module for transferring said license when said node identifier information matches said official node identifier and when said sequence number information matches said official sequence number.

42. The electronic device of claim 41, wherein said key comprises a removal key, and said transfer module removes said license from said pool of licenses.

43. The electronic device of claim 41, wherein said key comprises an add key and said transfer module adds said license to said pool of licenses.

* * * * *

UNITED STATES PATENT AND TRADEMARK OFFICE
CERTIFICATE OF CORRECTION

| | | |
|---|---|---|
| PATENT NO. | : 7,725,721 B2 | Page 1 of 1 |
| APPLICATION NO. | : 10/993634 | |
| DATED | : May 25, 2010 | |
| INVENTOR(S) | : Yellai et al. | |

It is certified that error appears in the above-identified patent and that said Letters Patent is hereby corrected as shown below:

Title Page, item [56]
Column 2 (U.S. Patent Documents), line 6      Delete "7,067,567" and insert
-- 7,062,567 --, therefor.

Column 18, line 37      In Claim 3, delete "claim 2" and insert
-- claim 2, --, therefor.

Column 21, line 21      In Claim 25, delete "claim 18" and insert
-- claim 18, --, therefor.

Column 24, line 11      In Claim 40, delete "off line" and
insert -- off-line --, therefor.

Signed and Sealed this
Twenty-fourth Day of May, 2011

David J. Kappos
*Director of the United States Patent and Trademark Office*